US011130579B2

(12) United States Patent
Insel et al.

(10) Patent No.: US 11,130,579 B2
(45) Date of Patent: Sep. 28, 2021

(54) DEVICE FOR EQUALIZING A PRESSURE DIFFERENCE FOR AN AIRCRAFT

(71) Applicant: Lufthansa Technik AG, Hamburg (DE)

(72) Inventors: Johannes Insel, Hamburg (DE); Sebastian Begemann, Hamburg (DE); Daniel Koch, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 53 days.

(21) Appl. No.: 16/613,458

(22) PCT Filed: May 14, 2018

(86) PCT No.: PCT/EP2018/062361
§ 371 (c)(1),
(2) Date: Nov. 14, 2019

(87) PCT Pub. No.: WO2018/210744
PCT Pub. Date: Nov. 22, 2018

(65) Prior Publication Data
US 2021/0039795 A1    Feb. 11, 2021

(30) Foreign Application Priority Data

May 15, 2017    (DE) .................... 10 2017 208 115.5

(51) Int. Cl.
*B64D 13/04*     (2006.01)
*F16K 17/04*     (2006.01)
(Continued)

(52) U.S. Cl.
CPC .......... *B64D 13/04* (2013.01); *F16K 17/0413* (2013.01); *F16K 17/196* (2013.01);
(Continued)

(58) Field of Classification Search
CPC .. B64C 1/00; B64C 1/18; B64C 1/066; F16K 17/0413; F16K 17/196; B64D 13/04;
(Continued)

(56) References Cited

U.S. PATENT DOCUMENTS 3,571,977 A * 3/1971 Abeel ................... E05B 51/023
49/379
4,899,960 A * 2/1990 Hararat-Tehrani ........ B64C 1/18
137/68.11
(Continued)

FOREIGN PATENT DOCUMENTS

AT         510153 A4    2/2012
DE       10031714 A1    1/2002
(Continued)

*Primary Examiner* — Craig M Schneider
*Assistant Examiner* — Frederick D Soski
(74) *Attorney, Agent, or Firm* — Leydig, Voit & Mayer Ltd.

(57) ABSTRACT

A device that equalizes an aircraft pressure difference has a separating wall, fixable to the aircraft, and a decompression valve. The wall is for fluidically separating first and second spaces, and has a flow opening that fluidically connects the spaces. The valve closes the flow opening. A securing element on the valve or wall enables a release of the valve when a pressure gradient between the spaces is exceeded, such that there is a fluidic connection between the spaces. The receiving element on the wall or valve is connected to the receiving element. The securing element has a rotary element and fixing elements. The rotary element is rotatably mounted about a rotational shaft. The rotary element is receivable in the receiving element. The fixing elements non-rotatably fix the rotary element beneath the predetermined pressure gradient. At least one of the fixing elements is a spring.

12 Claims, 3 Drawing Sheets

(51) Int. Cl.
*F16K 17/196* (2006.01)
*B64C 1/00* (2006.01)
*B64C 1/06* (2006.01)
*B64C 1/18* (2006.01)

(52) U.S. Cl.
CPC .............. *B64C 1/00* (2013.01); *B64C 1/066* (2013.01); *B64C 1/18* (2013.01); *B64C 2001/009* (2013.01); *Y10T 137/773* (2015.04); *Y10T 137/7723* (2015.04); *Y10T 137/7725* (2015.04); *Y10T 137/7734* (2015.04); *Y10T 137/7771* (2015.04)

(58) Field of Classification Search
CPC ......... Y10T 137/7723; Y10T 137/7725; Y10T 137/773; Y10T 137/7734; Y10T 137/7771
USPC ........................................................ 251/294
See application file for complete search history.

(56) References Cited

U.S. PATENT DOCUMENTS

| | | | |
|---|---|---|---|
| 6,651,932 B2 | 11/2003 | Diehl et al. | |
| 8,490,922 B2 | 7/2013 | Benthien et al. | |
| 8,567,721 B2 | 10/2013 | Voss et al. | |
| 8,714,483 B2 | 5/2014 | Hoetzeldt et al. | |
| 8,955,803 B2 | 2/2015 | Voss et al. | |
| 9,114,869 B1 | 8/2015 | Barrett et al. | |
| 9,387,917 B2 | 7/2016 | Pamminger et al. | |
| 9,415,876 B1* | 8/2016 | Baic | E05C 19/04 |
| 10,240,389 B2* | 3/2019 | Do | E06B 5/12 |
| 2010/0096035 A1 | 4/2010 | Appleby et al. | |
| 2015/0375866 A1* | 12/2015 | Salgues | B64C 1/1423 244/129.5 |
| 2016/0272334 A1 | 9/2016 | Kawano et al. | |
| 2017/0291674 A1 | 10/2017 | Zeeb et al. | |

FOREIGN PATENT DOCUMENTS

| | | |
|---|---|---|
| DE | 102007011627 A1 | 7/2008 |
| DE | 102009012015 A1 | 9/2010 |
| DE | 102010045197 A1 | 3/2012 |
| DE | 102009006395 B4 | 7/2014 |
| DE | 102015205939 A1 | 10/2016 |
| DE | 102015207599 B4 | 12/2016 |
| EP | 3228535 A1 | 10/2017 |
| WO | WO 2016156298 A1 | 10/2016 |
| WO | WO 2016169750 A1 | 10/2016 |

* cited by examiner

DEVICE FOR EQUALIZING A PRESSURE DIFFERENCE FOR AN AIRCRAFT

CROSS-REFERENCE TO PRIOR APPLICATIONS

This application is a U.S. National Stage Application under 35 U.S.C. § 371 of International Application No. PCT/EP2018/062361 filed on May 14, 2018, and claims benefit to German Patent Application No. DE 10 2017 208 115.5 filed on May 15, 2017. The International Application was published in German on Nov. 22, 2018 as WO 2018/210744 A1 under PCT Article 21(2).

FIELD

The present invention relates to a device for equalising a pressure difference for an aircraft comprising.

BACKGROUND

In aeroplanes, in particular in passenger aeroplanes, a large part of the aeroplane interior volume is usually designed as a pressurised cabin in which the air pressure is regulated during flight to a level that is adapted for people on the flight. This is necessary due to the large pressure differences from the normal ambient pressure that prevails at flight altitude. In this case, the entire interior volume can be designed as a pressurised cabin, or only portions which are provided for the accommodation of people during the flight, for example excluding the cargo space.

Within the scope of aeroplane cabin modifications, in particular in the field of converting passenger aeroplane cabins for VIP use, it is normal to separate off, relative to the total passenger volume, small passenger compartments for different purposes, for example as a conference, relaxation or media space, and to divide the cabins by installing different, partially room-height furniture. Further pieces of furniture are often also built in, for example as storage units, which furniture pieces have a smaller space volume in relation to the passenger compartment in which said pieces are built.

In the case of a rapid drop in pressure, for example as a result of damage to the side wall of the aircraft in the region of a passenger compartment of this kind, the sudden decompression of the pressurised cabin, which in the following is referred to as a first space, leads to a sudden drop in pressure in this first space. A second space which is adjacent to the first space and is separated from the first space by at least one separating wall can only carry out this drop in pressure in a delayed manner, such that, for at least a short period of time, there is a difference in pressure between the first and the second space, which pressure difference bears on the separating wall. The separating wall can, in this case, be formed by a space partition, such as a wall or a ceiling, or an external wall of a piece of furniture.

Due to the volumes of the separated spaces, some of which are relatively low, very large differential pressures can act on the compartment boundaries or walls, which pressures can cause considerable and dangerous consequential damages, specifically if the separating wall is burst by the pressure difference and parts of the separating wall move uncontrollably through the passenger cabin as a result.

In order to avoid excessive loads of this kind on the installed walls and furniture, and therefore avoid an overload of the fittings or even the aeroplane structure, flow openings can be provided between the spaces of the pressure cabin, which openings are always open or which open as a result of a pressure difference. Flow openings of this kind are intended to influence the use and design concept as little as possible, in particular in a VIP conversion, and are usually arranged in a non-visible region in a labyrinth-like manner, or are closed by a decompression valve during normal operation, i.e. as long as a predetermined critical pressure difference is not exceeded.

The decompression valve is fastened to the separating wall such that the flow opening is released shortly before the predetermined critical pressure difference between the first space and the second space is exceeded. In order for the decompression valve which releases out of the flow opening to not cause any injuries to the passengers as a result of the sudden release movement in the event of decompression, the decompression valve is connected to a structure which is fixed to the aircraft, for example to the separating wall itself, by means of a securing device. This connection can, for example, be achieved using a hinge or a securing line. The securing device also prevents an uncontrolled movement during an unintentional release of the decompression valve, for example as a result of high accelerations in turbulence or during an emergency landing.

In order to allow the opening of the decompression valve, the decompression valve is held by a securing element, which releases the decompression valve when a critical pressure difference is exceeded.

The securing element can be designed as a type of rubber lip that is clamped between two grooves on the face of the separating wall and on the face of the decompression valve, respectively. This is disadvantageous in that the materials are not age resistant, and the triggering pressures are dependent on fitting tolerances, temperature differences or material aging and therefore cannot be reliably reproduced, and in that large triggering pressure ranges occur. The opening behaviour of the decompression valve depending on a defined pressure difference is in this case to be determined by extensive testing and adaptation. A corresponding decompression valve and an associated testing method are known from DE 10 2015 207 599 B4, for example.

SUMMARY

An embodiment of the present invention provides a device that equalizes a pressure difference for an aircraft and has a separating wall and a decompression valve. The separating wall is fixed to the aircraft to fluidically separate a first and second space, and has a flow opening that fluidically connects the first and second space. The decompression valve closes the flow opening. A securing element on the decompression valve or on the separating wall enables a release of the decompression valve when a pressure gradient between the first space and the second space is exceeded, such that there is a fluidic connection between the first space and the second space. The receiving element provided on the separating wall or on the decompression valve is operatively connected to the receiving element. The securing element has a rotary element and at least two fixing elements. The rotary element is rotatably mounted about a rotational shaft. The rotary element is configured to be received in the receiving element. The fixing elements non-rotatably fix the rotary element beneath the predetermined pressure gradient in a fixing position. At least one of the at least two fixing elements is a spring element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
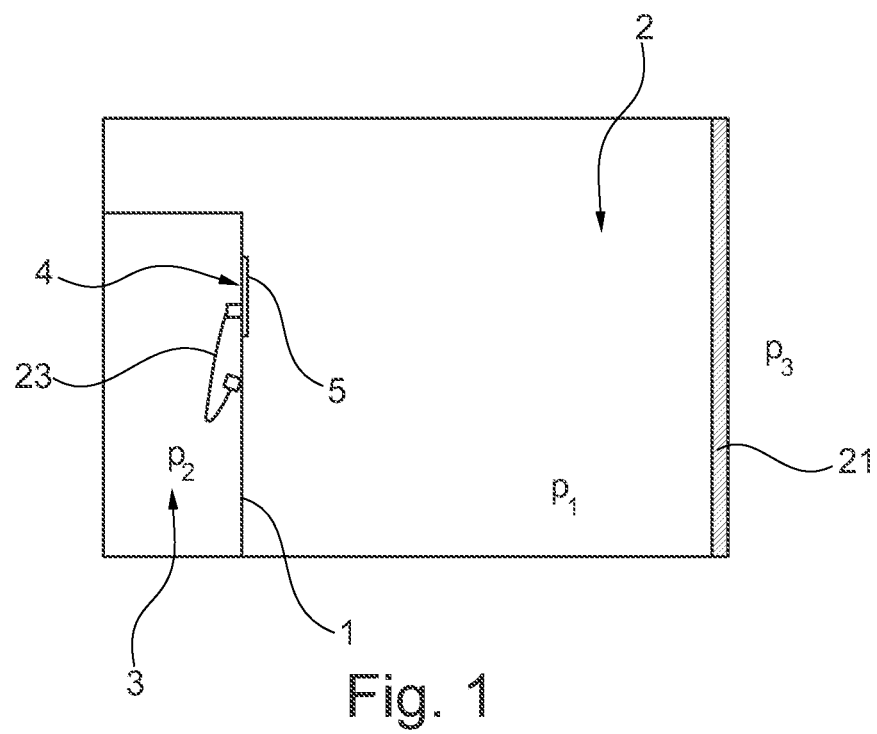
FIG. 1 schematically shows a device according to an exemplary embodiment of the invention for equalising a pressure difference for an aircraft.

Embodiments of the present invention provide a device for equalising a pressure difference using a decompression valve. The device has an opening behaviour, as compared to conventional devices, that can be better predicted and has more precise triggering values, and simultaneously reduces the amount of necessary maintenance and testing.

According to an exemplary embodiment of the invention, a device for equalising a pressure difference for an aircraft is provided, which comprises a planar separating wall, which is fixed to the aircraft and fluidically separates a first space from a second space. The separating wall has a flow opening, which fluidically connects the first and the second space, the flow opening being closed by a decompression valve. A securing element on the decompression valve or the separating wall is designed to enable a release movement of the decompression valve when a predetermined pressure gradient between the first and the second space is exceeded, such that there is a fluidic connection between the first and the second space, a receiving element being provided on the separating wall or the decompression valve, to which receiving element the securing element is operatively connected, the securing element comprising a rotary element and at least two fixing elements. The rotary element is, in this case, rotatably mounted about a rotational shaft, and is provided to be received in the receiving element. The fixing elements fix the rotary element without play beneath the predetermined pressure gradient in a fixing position, at least one of the at least two fixing elements being a spring element.

The rotary element is fixed without play, i.e. non-rotatably, centrally between the fixing elements in the fixing position by means of the fixing elements. In the fixing position, the receiving element on the separating wall engages around an end of the rotary element, such that the decompression valve is secured in position by the rotary element, which is fixed having the one end in the receiving element and the opposite end between the fixing elements. If pressure is applied to the decompression valve, a torque is applied to the rotary element that is dependent on the pressure applied. A spring strength of a fixing element, which is designed as a spring element, which strength is adapted to a predetermined pressure gradient, subsequently allows a rotation of the rotary element out of the fixing position thereof, as a result of which the spring element is in turn further loaded beyond the preload force thereof. Starting from a specific rotational movement of the rotary element, and therefore an achieved triggering force of the spring element, the rotary element is released from the receptacle, as a result of which the decompression valve opens and is released. The maximum triggering force is achieved before the rotary element rotates completely out of the receptacle. A good reproducibility is therefore achieved, since the maximum value of the triggering force is not dependant on the triggering path. In this case the triggering pressure ranges, from the guaranteed holding force to the guaranteed triggering force, are significantly narrower than in the solution known from the prior art that has rubber lips, as a result of which prior modifying and testing of the parts can largely be dispensed with. For a rotatory opening of the decompression valve, at least one triggering device can be provided on the decompression valve. For a translatory opening of a decompression valve without a rotational shaft, preferably two or more triggering devices are provided on the decompression valve.

According to a preferred embodiment, the at least one spring element is a planar flexural spring element. Planar spring elements can be cost-effectively produced at a high level of precision as flat springs, for example. Due to the planar design, expanded contact regions of the spring elements and of the rotary element are produced, as a result of which the forces are evenly distributed. In addition, planar spring elements can be easily fastened to a holding element, for example by means of clamping jaws, as a result of which an exactly positioned mounting is made possible, which in particular avoids tilting and therefore contributes to a precise transmission of force.

It is also preferable for the at least one spring element to be preloaded. The spring strength of a single spring element consequently becomes adjustable, and the use of different spring elements for different triggering pressure gradients that, for example, differ in the dimensions or materials thereof is avoided. The rotary element is firmly enclosed as a result of the preloading, such that shaking is suppressed. Therefore, only the preload force is to be adjusted for different fields of use. The defined preload force is in this case adapted to the predetermined triggering differential pressure such that the torque on the rotary element only provides a restoring force for the spring element that is sufficient to release the rotary element and to release the securing of the decompression valve when the triggering differential pressure is reached.

According to a preferred embodiment, the rotational shaft and the spring elements are fastened to a holding element. The mounting of the device is made easier by fastening to a component, since all individual parts can be installed already pre-mounted on the holding element. In addition, the holding element allows an exact positioning of the rotary element relative to the fixing and spring elements.

In this case, it is further preferred for the spring elements in a fastening region to abut the holding element in a planar manner. Positioning and fastening the planar spring element such that it is positionally fixed and secured against tilting is easily possible as a result of the planar abutment.

A preferred embodiment is distinguished by abutment edges being provided on the holding element, the preloading of the spring elements being achieved by abutment against the abutment edges. The abutment edges of the holding element can be easily formed by a step that is elevated above the plane of the abutment surface of the spring element in the fastening region. The planar spring element is bent away from the abutment surface as a result. The preload force can be adjusted, for example, by the spacing between the fastening of the spring element and the abutment edge, and by the dimensions thereof. The fixing end of the rotary element would then be intended to be correspondingly adapted to the dimensions of the abutment edge. Furthermore, the abutment of the spring elements against the abutment edges leads to the rotary element, during normal operation, i.e. below the predetermined triggering differential pressure, being mounted without play in the fixing position, but also centrally between the spring elements without force, as a result of the selection of suitable dimensions and tolerances. The spring elements do not exert any force on the rotary element during normal operation. During a rotary movement of the rotary element, a spring element is further loaded, while the relevant other spring element continues to abut the abutment edge such that it does not exert any forces on the rotary element.

In an alternative development, two spring elements are used which have different spring strengths. This allows different triggering pressure gradients for opposing flow directions. As a result, in the case of a drop in pressure in the first room, the decompression valve, which is provided in a separating wall between a first space and a second space, can open at a lower pressure gradient than in the case of a drop in pressure in the second room. The abutment of the spring elements against the abutment edges in this case also allows the rotary element to be mounted in the fixing position without force.

Alternatively, a fixing element is designed as a rigid element. In this context, 'rigid' means that the fixing element is explicitly not designed as a spring element, and instead is not subject to any bending or other resilient deformation during the pressure gradients which are to be expected, and blocks a movement of the rotary element in the direction of the rigid element in a dimensionally stable manner, and therefore reliably prevents and blocks the opening of the decompression valve in one direction.

According to a preferred embodiment, the rotary element is adapted to the fixing element such that at least one fixing element functions as a stop element, which limits the rotational angle of the rotary element outside the fixing position. In order to prevent the rotary element from swinging through, the relevant non-loaded spring element functions as a stop for the rotary element. The rotational angle is more preferably limited to 90° from the fixing position. In the triggered state, the rotary element is therefore positioned perpendicularly to the starting position in the fixing position, as a result of which the rotary element only minimally projects over the edge of the decompression valve, and the risk of damages to other design and wall elements during the opening of the decompression valve is reduced.

A preferred embodiment is distinguished by the fact that the face of the rotary element that is provided to be received on the receiving element has a rounded shape, in order to allow a movement between the parts that is as frictionless as possible, and to prevent a tilt of the rotary element in the receptacle.

It is also preferable for slots to be provided on the receiving element. The mounting of the receiving element is simplified by the slots, in that suitable fastening elements are guided through the slots. The positioning of the receiving element can be adjusted by sliding along the slots, in order to ensure an optimal positioning of the rotary element in the receiving element. Said element can also be adjusted in the mounted state in this manner.

The invention is explained in the following using preferred embodiments with reference to the attached drawings.

FIG. 1 shows, in a schematic and exemplary manner, a structure of a passenger aeroplane having a VIP conversion. In this case, a first space 2 is provided which is formed by a passenger compartment, for example. A second space 3 is adjacent to the first space 2, which second space is separated from the first space 2 by at least one separating wall 1. In this embodiment, the second space 3 is preferably formed by a storage space, more preferably by the surrounding wall of a piece of furniture. On the right-hand side of FIG. 1, a side wall 21 is shown which separates the first space 2 from the environment. In FIG. 1, the space volume of the first space 2 is greater than the space volume of the second space 3, it also being possible within the scope of the invention for the volume distribution to be organised differently.

It is assumed that the passenger aeroplane is at cruising altitude, such that the ambient pressure p3 is lower than the pressures p1 and p2 in the first space 2 and the second space 3. It can further be assumed that, due to minimal flow openings between the spaces 2 and 3, which spaces are formed by gaps, for example, a stationary state which has almost identical pressures p1 and p2 has been established.

It is further shown that a flow opening 4 is closed by a decompression valve 5 such that, except for via the flow opening 4, there is no fluidic connection between the first space 2 and the second space 3.

Figure 2:
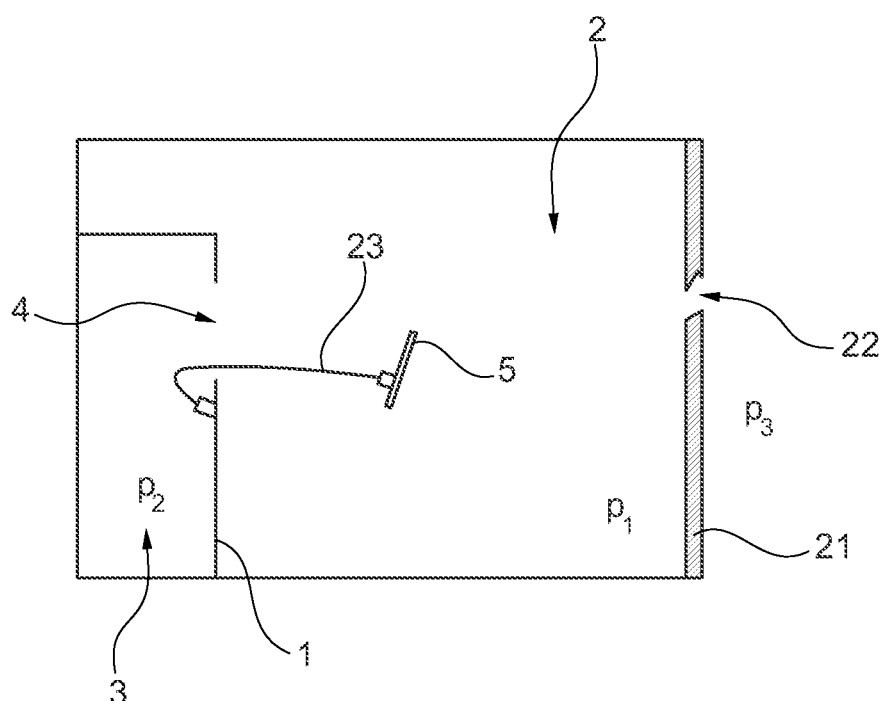
FIG. 2 schematically shows a device according to an exemplary embodiment of the invention for equalising a pressure difference shortly after a sudden drop in pressure.

FIG. 2 shows the structure of a passenger aeroplane having a VIP conversion which is analogous to FIG. 1, shortly after a sudden drop in pressure, for example as a result of a hole 22 in the side wall 21. The drop in pressure of the pressure p1 is caused by damage 22 in the side wall 21 such that, within a very short space of time, the pressure p1 in the first space 2 equalises with the ambient pressure p3. At this point in time, the second space 3 is, as far as possible, fluidically separated from the first space 2 by the separating wall 1 and the flow opening 4 which is still closed by the decompression valve 5, such that the pressure p2 can be assumed to be constant, at least for a short period of time immediately after the drop in pressure in the first space 2; the pressure p2 is therefore greater than the pressure p1.

As soon as a critical differential pressure |p2−p1| is exceeded, a fastening for holding the decompression valve 5 in the separating wall 1 is released, such that the decompression valve 5 is released instantaneously, and completes a release movement into the first space 2.

As is also shown in FIG. 2, the release movement is limited by a securing band 23, such that the decompression valve 5 can only reach an end position which is shown in FIG. 2. Alternatively, a one-sided, fixed binding of the decompression valve 5 can also be provided by means of a rotational fitting.

Figure 3:
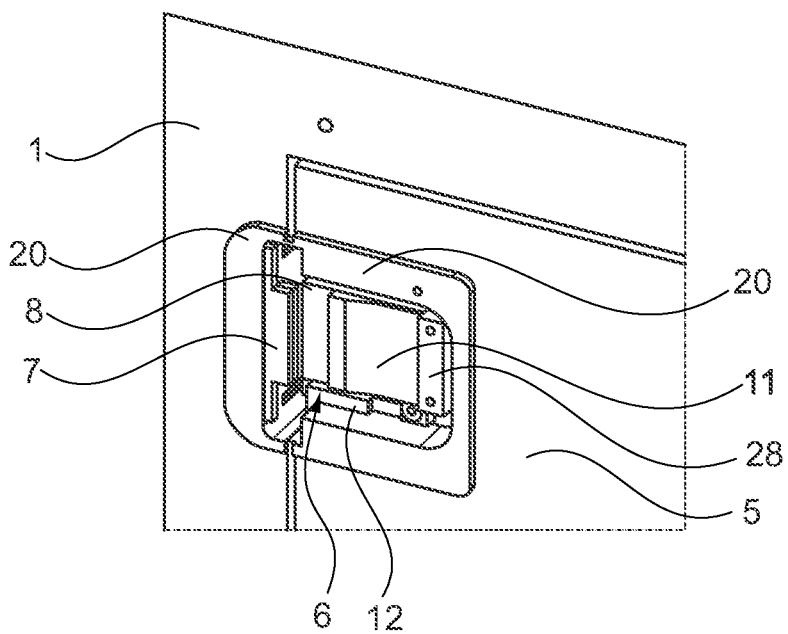
FIG. 3 shows an embodiment of a device according to an exemplary embodiment of the invention for equalising a pressure difference for an aircraft having a separating wall and a decompression valve in normal operation.
Figure 4:
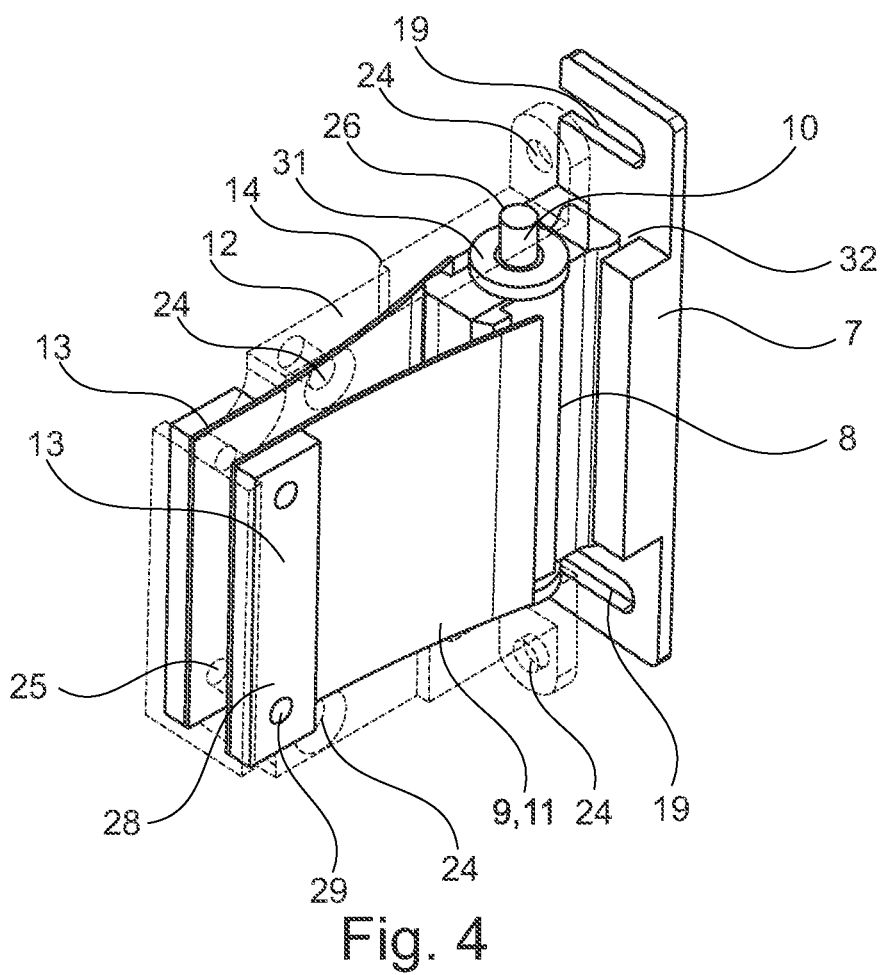
FIG. 4 shows a view of an embodiment of a device according to an exemplary embodiment the invention for equalising a pressure difference for an aircraft.

The decompression valve 5 and the connection to the separating wall 1 are shown in FIG. 3 and in detail in FIG. 4. For easier installation on the decompression valve 5 and on the separating wall 1, the decompression valve 5 and the fixedly mounted part of the separating wall 1 are provided with inserts in which the connection elements are mounted. For the inserts 20, recesses can be provided on the decompression valve 5 and on the separating wall 1, in which recesses the inserts can be mounted, for example by gluing the inserts 20 into recesses which are adapted to the shape of the inserts 20. As a result, the connection and securing mechanism does not protrude beyond the external surface of the decompression valve 5 or of the separating wall 1 and negatively interfere in the appearance of the fittings. In this case, a receiving element 7 is arranged in the insert 20 which is embedded in the separating wall 1. The securing element 6 is fixed to the insert 20 which is embedded in the decompression valve 5 by means of a holding element 12, on which holding element the further individual parts of the device are fastened. In this case it does not preclude the functionality of the device according to the invention if the inserts 20 are installed on the relative other part of the separating wall 1 or the decompression valve 5. FIG. 1 shows the device according to the invention in normal operation, i.e. when there is a differential pressure |p2−p1| which is smaller than the predetermined critical differential pressure |p2−p1| at which the devices are intended to trigger. In this case, the end of a leg 16 of a rotary element 8 is received in a receiving element 7, while the end of the opposite leg 17 of the rotary element 8 is enclosed between two fixing elements 9, only one face of the device being visible in the lateral illustration of FIG. 3, and the second fixing element 9 therefore being hidden. In the embodiment shown, both fixing elements 9 are designed as spring elements 11, in this case as planar, rectangular flexural springs.

The device according to the invention is received in the inserts 20 and a preferred embodiment is shown in detail in FIG. 4. The holding element 12 extends centrally in the direction of extent of the decompression valve 5 and is provided with fastening receptacles. Feedthroughs 24 are provided for fastening to the associated inserts 20 or directly onto the separating wall 1 or the decompression valve, through which feedthroughs suitable fastening means (not shown) can be guided and ensure a secure fixing of the holding element 12 in all operational conditions. The fastening means can in this case be easily achieved using screws or rivets. In addition, feedthroughs 25 are provided in a fastening region 13 of the holding element 12, which feedthroughs ensure a fastening of the fixing elements 9 or spring elements 11. In the embodiment shown, the fastening region 13 is formed by two planar, opposite faces of the holding element 12 which extend parallel to one another. Said planar faces are provided for the planar abutment of the fixing or spring elements 9, 11. In the mounted state, the spring elements 11 are arranged in the fastening region 13 of the holding element 12 between the fastening region 13 of the holding element 12 and additional clamping jaws 28 which support the planar abutment of the spring elements 11. Corresponding feedthroughs 29 relative to the feedthroughs 25 of the holding element 12 in the fastening region 13 are provided in the spring elements 11 and the clamping jaws 28 such that a mounting can take place, for example using pins or long screws. Other suitable fastening means are also conceivable within the scope of this invention.

The holding element 12 in addition also has receptacles 26 for a pivot bearing of the rotary element 8 that forms the rotational shaft 10 of the rotary element 8. The rotational shaft 10 in this case extends centrally in the central plane of the holding element 12 and parallel to the direction of extent of the receiving element 7, i.e. parallel to the outer edge of the decompression valve 5 and the separating wall 1, and is arranged on the end of the holding element 12 that is remote from the fastening region 13, i.e. in the immediate proximity of the gap between the separating wall and the decompression valve 5. The rotary element 8 is rotatably mounted about a rotational shaft 10 so as to have suitable spacers 31 positioned relative to the holding element 12, such that a frictionless movement which is as free as possible is achieved. The rotary element 8 is positioned centrally between the spring elements 11, and in this case is dimensioned such that in normal operation it is mounted as far as possible without play. In the shown embodiment, the fixing without play is ensured in that the extension of the rotary element 8 at the end of the leg 17 of the rotary element 8 which is fixed between the spring elements 10 exactly, i.e. within the usual tolerances, corresponds to the spacing of the spring elements 11 from one another in this position. In the plan view shown in FIG. 5, the positioning in normal operation can likewise be seen clearly. In a first leg 17, the rotary element 8 extends from the rotational shaft 10 to the end which is positioned between the spring elements 11, and in a second leg 16 extends in an opposite direction of extension to the first leg 17 from the rotational shaft 10 to the end which is received in the receiving element 7. The receiving element 7 is substantially formed by a groove 32 which extends parallel to a direction of extension of the separating element 1 and of the decompression valve 5, the dimensions of the groove 32 and of the receiving end 16 of the rotary elements 8 corresponding such that the rotary element 8 is received in the groove 32 without play. In this case it is advantageous for the end of the rotary element 8 that is provided to be received in the groove 32 of the receiving element 7 to have a rounded shape, in order to prevent a tilt during the release movement of the decompression valve 5. It is in particular advantageous for said end of the rotary element 8 to be circular, such that it can rotate out of the groove 32 in an optimal manner.

Figure 5:
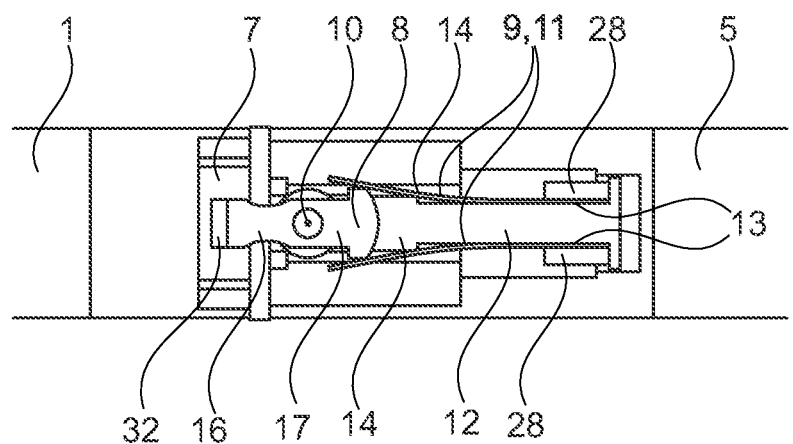
FIG. 5 shows a plan view of the embodiment of a device according to an exemplary embodiment of the invention for equalising a pressure difference for an aircraft, which embodiment is shown in FIG. 4.

It can be seen in FIG. 5 that the holding element 12 has abutment edges 14 for the spring elements 11 that are formed by a step which is elevated above the planar surface of the fastening region 13 of the holding element 12. The spring elements 9, 11 rest against the holding element 12 and the abutments edges 14 in a planar manner in the fastening region 13, as a result of which the spring elements 11 are subject to a preloading. The abutment against the abutment edges 14 in this case allows the spring elements 11 to be positioned independently of the spring strengths thereof, as a result of which a reproducible central positioning and fixing of the rotary element 8 without play is ensured, even when using spring elements 11 which have different spring strengths.

Spring elements 11 having a plurality of standard spring strengths can be used for standardised operation, which springs can be combined with one another. In this case, the sheet thickness of the spring elements and the geometry thereof, for example, can be modified. The spring element can, for example, be T-shaped. It is therefore conceivable for predetermined triggering forces to be ensured as a result of individual spring elements 11 which have different spring strengths being combined in an appropriate manner and stacking to form a combined spring element 11. An adaptation to different triggering forces that can be reproduced and largely freely combined is therefore made possible without extensive testing measures.

If pressure is applied to the decompression valve 5 in the case of a drop in pressure, the decompression valve 5 is moved in the direction of the space 2 which has the lower pressure, as a result of which the rotary element 8 undergoes a rotation, as a result of which a spring element 11 is in turn further loaded beyond the preload force thereof. The relevant other spring element 11 continues to rest on the abutment edge 14, such that it does not exert any forces on the rotary element 8. Starting from a specific rotational movement of the rotary element 8, and therefore an achieved triggering force, the receiving end 16 of the rotary element 8 rotates out of the groove 32 of the receiving element 7, as a result of which the decompression valve 5 is triggered and released. The force which acts on the decompression valve 5 is transmitted to the spring elements 11. Since, during triggering, the rotary element 8 rotates about the rotational shaft 10 and rolls in the receiving element 7, the gap between the decompression valve 5 and the separating wall 1 is not critical with regard to the exact dimensions thereof.

The rotary element 8 rotates as far as a maximum rotational angle, in this case 90° for example, and then strikes against the spring element 11 which is not actuated, such that the rotary element 8 is prevented from swinging through beyond the maximum rotational angle is prevented. The dimensions of the rotary element 8 can be adapted for this purpose, for example by a tapering of the receiving leg 16 in FIG. 5.

Figure 6:
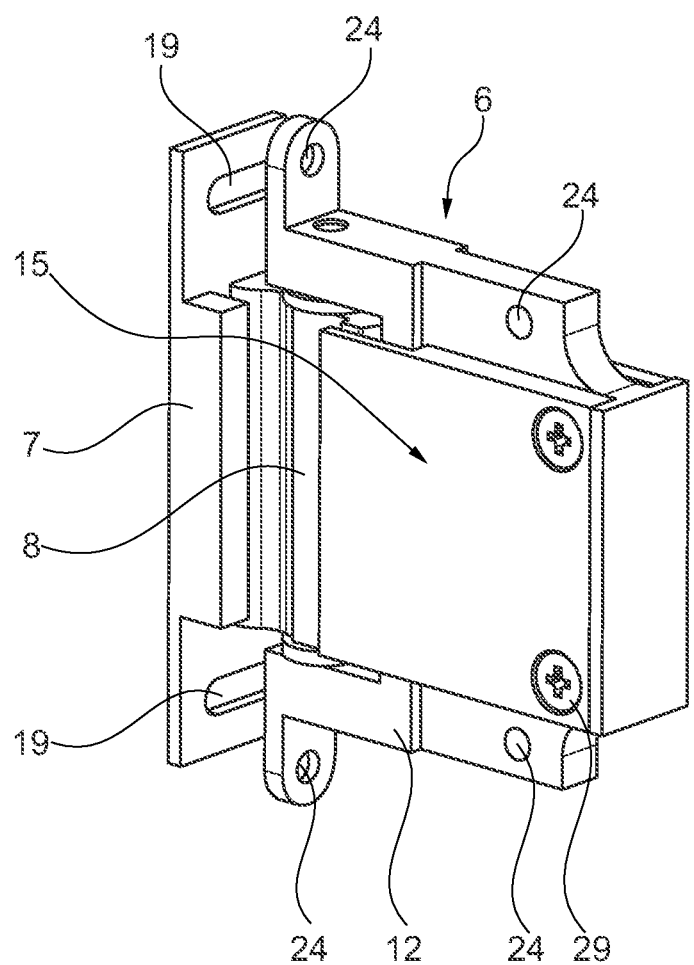
FIG. 6 shows a view of an alternative exemplary embodiment of a device according to the invention for equalising a pressure difference for an aircraft, having a rigid fixing element.

In the case that a triggering of the decompression valve 5 in one direction is to be precluded, a fixing element 9 can explicitly be designed as a rigid element 15, instead of as a spring element 11, as shown in FIG. 6. Instead of a spring element 11, a rigid component is used which, by means of the solid design thereof, precludes a spring motion or other resilient deformation during the operational parameters which are to be expected. Through-holes 29 for receiving fastening means can likewise be provided on said fixing element 9, 15, such that a mounting which is analogous to the spring element 11 and the clamping jaw 28 is made possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for equalizing a pressure difference for an aircraft, the device comprising:

a planar separating wall, which is configured to be fixed to the aircraft and to fluidically separate a first space from a second space, the separating wall having a flow opening, which is configured to fluidically connect the first space and the second space;

a decompression valve, which is configured to close the flow opening;

a securing element on the decompression valve or on the separating wall, the securing element being configured to enable a release movement of the decompression valve when a predetermined pressure gradient between the first space and the second space is exceeded, such that there is a fluidic connection between the first space and the second space; and a receiving element provided on the separating wall or on the decompression valve, the securing element being operatively connected to the receiving element, wherein:

the securing element comprises a rotary element and at least two fixing elements, the rotary element is rotatably mounted about a rotational shaft, the rotary element is configured to be received in the receiving element, the fixing elements non-rotatably fix the rotary element beneath the predetermined pressure gradient in a fixing position, and at least one of the at least two fixing elements is a spring element.

2. The device according to claim 1, wherein the at least one spring element is a planar flexural spring element.

3. The device according to claim 1, wherein the at least one spring element is preloaded.

4. The device according to claim 3, wherein the rotational shaft and the spring elements are fastened to a holding element.

5. The device according to claim 4, wherein the spring elements abut the holding element in a planar manner in a fastening region.

6. The device according to claim 5, wherein the preloading of the spring elements is achieved by abutment against the abutment edges of the holding element.

7. The device according to claim 6, wherein two spring elements having different spring strengths are provided.

8. The device according to claim 1, wherein at least one of the fixing elements is a rigid element.

9. The device according to claim 1, wherein the rotary element is adapted to the fixing elements such that at least one of the fixing elements functions as a stop element that limits the rotational angle of the rotary element outside the fixing position.

10. The device according to claim 9, wherein the deflection of the rotary element out of the fixing position is limited to a rotational angle of 90° about the rotational shaft.

11. The device according to claim 1, wherein a leg of the rotary element that is provided to be received on the receiving element has a rounded shape.

12. The device according to claim 1, wherein slots are provided on the receiving element.

* * * * *